US008976172B2

(12) United States Patent
Jones (10) Patent No.: US 8,976,172 B2
(45) Date of Patent: Mar. 10, 2015

(54) THREE-DIMENSIONAL SCANNING USING EXISTING SENSORS ON PORTABLE ELECTRONIC DEVICES (71) Applicant: RealityCap, Inc., San Francisco, CA (US)

(72) Inventor: Eagle Sunrise Jones, San Francisco, CA (US)

(73) Assignee: RealityCap, Inc., San Francisco, CA (US)

( * ) Notice: Subject to any disclaimer, the term of this patent is extended or adjusted under 35 U.S.C. 154(b) by 235 days.

(21) Appl. No.: 13/716,139

(22) Filed: Dec. 15, 2012

(65) Prior Publication Data
US 2014/0168212 A1 Jun. 19, 2014

(51) Int. Cl.
G06T 15/00 (2011.01)
G06T 17/00 (2006.01)
G06T 7/00 (2006.01)

(52) U.S. Cl.
CPC ............. *G06T 17/00* (2013.01); *G06T 2200/08* (2013.01); *G06T 7/0071* (2013.01)
USPC ............ 345/420; 345/419; 345/422; 702/155

(58) Field of Classification Search
CPC ........ G06T 7/00; G06T 17/00; G06T 2200/08
USPC ........................... 345/420, 422, 419; 702/155
See application file for complete search history.

(56) References Cited

U.S. PATENT DOCUMENTS

| 7,301,528 | B2 | 11/2007 | Marvit |
| 7,516,039 | B2 * | 4/2009 | McKitterick ................. 702/155 |
| 2010/0134618 | A1 | 6/2010 | Kim |
| 2010/0305857 | A1 | 12/2010 | Byrne |
| 2012/0281087 | A1 | 11/2012 | Kruse |

OTHER PUBLICATIONS

Lopez, Miguel Bordallo et al. "Multimodal sensing-based camera applications." Proc. SPIE 7881, Multimedia on Mobile Devices 2011; and Multimedia Content Access: Algorithms and Systems V, 788103 (Feb. 17, 2011); doi:10.1117/12.871934.

* cited by examiner

*Primary Examiner* — Phu K Nguyen
(74) *Attorney, Agent, or Firm* — Chia-Hsin Suen (57) ABSTRACT The disclosed embodiments provide a method and system for operating a portable electronic device. The portable electronic device includes a camera that obtains a set of images and one or more inertial sensors that obtain inertial data associated with the portable electronic device. The portable electronic device also includes an analysis apparatus that uses the set of images to obtain a set of features in proximity to the portable electronic device. Next, the analysis apparatus updates a set of locations of the features based on the set of images and the inertial data. Finally, the analysis apparatus uses the set of features and the set of locations to provide a model of an environment around the portable electronic device without requiring the use of specialized hardware to track the features and the locations.

20 Claims, 7 Drawing Sheets

THREE-DIMENSIONAL SCANNING USING EXISTING SENSORS ON PORTABLE ELECTRONIC DEVICES

BACKGROUND

1. Field

The disclosure relates to three-dimensional (3D) scanning. More specifically, the disclosure relates to techniques for performing 3D scanning using existing sensors on portable electronic devices.

2. Related Art

Three-dimensional (3D) scanning may be used to construct 3D models of environments and/or objects. The models may then be used in applications such as movie and video game production, industrial design, medical devices, reverse engineering, prototyping, architecture, construction, computer-aided design (CAD), 3D printing, and/or quality control. For example, 3D scanning may be performed to model a piece of furniture, create a blueprint of a building's interior, and/or facilitate indoor and/or outdoor mapping and/or navigation.

To perform 3D scanning, 3D scanners typically construct a point cloud of the surface(s) of an object and/or environment by probing the surface(s). For example, a 3D scanner may acquire the shape of the object and/or environment using physical touch, a laser rangefinder, laser triangulation, structured light, modulated light, and/or conoscopic holography. The 3D scanner may also include visible-light sensors for capturing surface textures and/or colors, which may be used to fully reconstruct a 3D model of the object and/or environment. The 3D scanner may thus require unwieldy, expensive, complex and/or specialized equipment such as articulated arms, lasers, light sources, and/or cameras arranged in specific configurations, which may bar the use of the 3D scanner in many consumer and/or portable applications.

Consequently, adoption and/or use of 3D scanning technology may be increased by improving the usability, portability, size, and/or cost of 3D scanners.

SUMMARY

The disclosed embodiments provide a method and system for operating a portable electronic device. The portable electronic device includes a camera that obtains a set of images and one or more inertial sensors that obtain inertial data associated with the portable electronic device. The portable electronic device also includes an analysis apparatus that uses the set of images to obtain a set of features in proximity to the portable electronic device. Next, the analysis apparatus updates a set of locations of the features based on the set of images and the inertial data. Finally, the analysis apparatus uses the set of features and the set of locations to provide a model of an environment around the portable electronic device without requiring the use of specialized hardware to track the features and the locations.

In one or more embodiments, the system also includes a management apparatus that uses the model to generate a blueprint of the environment and/or measure a distance between a first point in the environment and a second point in the environment. For example, the management apparatus may use the model to reconstruct the environment and/or mitigate noise and/or drift associated with using the inertial data to track the motion of the portable electronic device.

In one or more embodiments, the set of features includes at least one of a corner, an edge, and a specialized feature.

In one or more embodiments, the set of features is associated with one or more boundaries of the environment. For example, the features may indicate the boundaries of the walls, ceilings, and/or floors of a room containing the portable electronic device.

In one or more embodiments, using the set of images from the camera to obtain the set of features in proximity to the portable electronic device involves at least one of tracking the features across the set of images, and identifying the features based on input from a user of the portable electronic device.

In one or more embodiments, updating the set of locations of the features based on the set of images and the inertial data involves:
  (i) using the model to predict a two-dimensional (2D) location of a feature from the set of features in an image from the set of images;
  (ii) obtaining a measurement of the 2D location from the image; and
  (iii) using a residual between the predicted 2D location and the measurement to estimate a three-dimensional (3D) location of the feature.

In one or more embodiments, using the model to predict the 2D location of the feature involves:
  (i) estimating a position and an orientation of the portable electronic device based on the set of images and the inertial data;
  (ii) applying the position and the orientation to a previous estimate of the 3D location; and
  (iii) projecting the 3D location onto an image plane of the portable electronic device.

In one or more embodiments, using the set of features and the set of locations to provide a model of an environment around the portable electronic device involves updating the model of the environment based on the position of the portable electronic device. For example, lines of sight from the position and/or orientation to visible features may be used to update a representation of the volume of unoccupied space in the environment. The representation may then be used to fit the features to boundaries, objects, and/or other aspects of the environment in the model.

In one or more embodiments, the 3D location is estimated based on a depth of the feature and the 2D location.

In one or more embodiments, the 2D location is associated with an arrival time of a scan line of the image. For example, the arrival time of the scan line may be based on the operation of a rolling shutter in the camera. As a result, movement and/or rotation of the portable electronic device may shift the 2D location within the image before the feature is captured by the shutter. To correct for such motion-based distortions in the image, the 2D location may be shifted back so that the 2D location corresponds to the arrival time of the first scan line of the image. Alternatively, each scan line may be considered a separate image taken at a different time by the camera, and a measurement of the 2D location may be viewed as taken at the arrival time of the scan line containing the feature.

In one or more embodiments, the one or more inertial sensors include an accelerometer and/or gyroscope.

BRIEF DESCRIPTION OF THE DRAWINGS

In the figures, like elements are denoted by like reference numerals.

DETAILED DESCRIPTION

In the following detailed description, numerous specific details are set forth to provide a through understanding of the disclosed embodiments. However, it will be apparent to those skilled in the art that the disclosed embodiments may be practiced without these specific details. In other instances, well-known features have not been described in detail to avoid unnecessarily complicating the description.

Methods, structures, apparatuses, modules, and/or other components described herein may be enabled and operated using hardware circuitry, including but not limited to transistors, logic gates, and/or electrical circuits such as application-specific integrated circuits (ASICs), field-programmable gate arrays (FPGAs), digital signal processors (DSPs), and/or other dedicated or shared processors now known or later developed. Such components may also be provided using firmware, software, and/or a combination of hardware, firmware, and/or software.

The operations, methods, and processes disclosed herein may be embodied as code and/or data, which may be stored on a non-transitory computer-readable storage medium for use by a computer system. The computer-readable storage medium may correspond to volatile memory, non-volatile memory, hard disk drives (HDDs), solid-state drives (SSDs), hybrid disk drives (HDDs), magnetic tape, compact discs (CDs), digital video discs (DVDs), and/or other media capable of storing code and/or data now known or later developed. When the computer system reads and executes the code and/or data stored on the computer-readable storage medium, the computer system performs the methods and processes embodied in the code and/or data.

The disclosed embodiments relate to a method and system for operating a portable electronic device such as a mobile phone, personal digital assistant, portable media player, tablet computer, and/or digital camera. More specifically, the disclosed embodiments provide a method and system for performing three-dimensional (3D) scanning using existing sensors on the portable electronic device.

Figure 1:
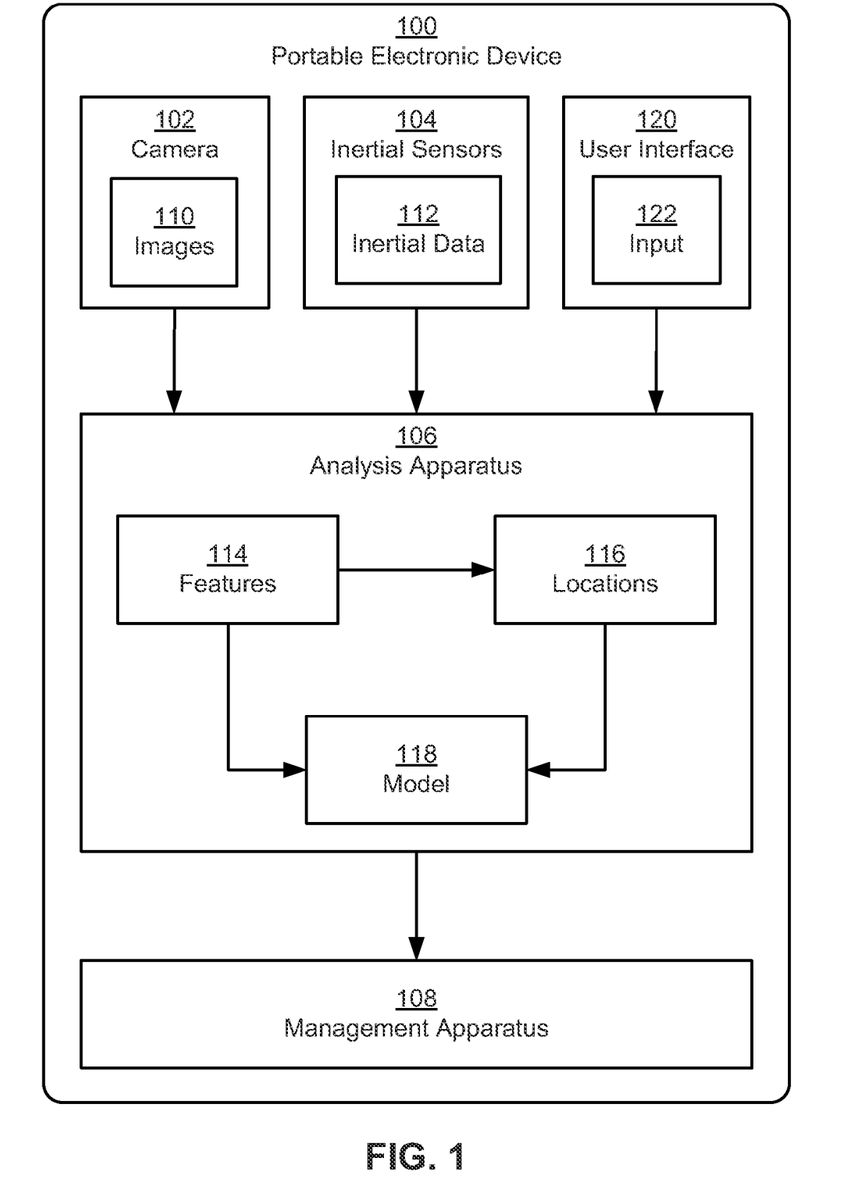
FIG. 1 shows a portable electronic device in accordance with one or more embodiments.

As shown in FIG. 1, a portable electronic device 100 may include a camera 102 that captures a set of images 110 of the environment around portable electronic device 100. For example, camera 102 may include a lens and a charge-coupled device (CCD) and/or complementary metal-oxide-semiconductor (CMOS) image sensor built into the body of portable electronic device 100. Images 110 (e.g., still images, video, etc.) from camera 102 may then be stored in memory on portable electronic device 100 and/or processed by a processor (e.g., central processing unit (CPU), graphics-processing unit (GPU), etc.) on portable electronic device 100.

Portable electronic device 100 may also include one or more built-in inertial sensors 104, such as accelerometers and/or gyroscopes, which collect inertial data 112 related to changes in the position, orientation, acceleration, and/or angular velocity of portable electronic device 100. Inertial data 112 may then be used by applications on portable electronic device 110 to change the orientation of a user interface 120 on portable electronic device 120 (e.g., between portrait and landscape), allow a user to provide input 122 to user interface 120 by moving and/or rotating portable electronic device 100, and/or perform other tasks for the user.

In one or more embodiments, portable electronic device 100 includes functionality to perform 3D scanning using existing sensors and/or hardware on portable electronic device 100, such as camera 102 and inertial sensors 104. In particular, an analysis apparatus 106 on portable electronic device 100 may obtain a set of features 114 in proximity to portable electronic device 100 from images 110. Analysis apparatus 106 may identify features 114 as areas within images 110 that are associated with high contrast and/or recognizable shapes and/or patterns. For example, analysis apparatus 106 may use a scale-invariant feature transform (SIFT) technique, Shi-Thomas technique, and/or other feature-detection technique to identify the corners and/or edges of a room containing portable electronic device 100, along with specialized features such as power outlets, windows, and/or furniture, as features 114 within the first image from images 110.

Analysis apparatus 106 may also obtain input 112 from the user to facilitate identification of features 114. For example, analysis apparatus 106 may display a live image from camera 102 within user interface 120 and request that the user select one or more features (e.g., corners, edges, specialized features, etc.) to be tracked as the user sees the feature(s) in the live image.

Next, analysis apparatus 106 may track features 114 across images 110 as images 110 are received from camera 102. For example, analysis apparatus 105 may use the Lucas-Kanade method, Horn-Schunk method, and/or other technique for estimating optical flow in images 110 to identify the same features in subsequent images 110 as portable electronic device 100 is translated and/or rotated with respect to the environment.

During tracking of features 114, analysis apparatus 106 may update a set of locations 116 of features 114 based on images 110 and inertial data 112 from inertial sensors 104. More specifically, analysis apparatus 106 may use images 110 to track locations 116 of features 114 relative to the position and orientation (e.g., pose) of portable electronic device 100. Analysis apparatus 106 may also use inertial data 112 to track the pose and/or motion of portable electronic device 100.

Inertial data 112 may thus be used to determine the scale by which locations 116 should be multiplied to determine the absolute distances of features 114 from portable electronic device 100. For example, analysis apparatus 106 may use inertial data 112 and multiple views of features 114 from images 110 to triangulate the absolute distances of features 114 from portable electronic device 100. At the same time, tracking of features 114 across images 110 may mitigate drift caused by noise during the integration of inertial data 112 (e.g., acceleration, angular velocity, etc.) from inertial sensors 104 to obtain motion and/or position information for portable electronic device 100. In other words, the combined analysis of images 110 and inertial data 112 may allow analysis apparatus 106 to accurately detect both the motion of portable electronic device 100 and locations 116 of features 114 around portable electronic device 100.

Analysis apparatus 106 may then use features 114 and locations to provide a model 118 of the environment around portable electronic device 100. As discussed in further detail below with respect to FIG. 2, model 118 may be used to estimate the 3D locations of features 114 based on measurements and predictions of two-dimensional (2D) locations of features 114 within images 110 and/or values of inertial data 112 from inertial sensors 104. For example, model 118 may be provided by an extended Kalman filter (EKF) that uses residuals between the measurements and predictions to adjust the state of the EKF and estimate the 3D locations of features 114.

After model 118 is created, a management apparatus 118 in portable electronic device 100 may use model 118 to perform one or more tasks for the user. For example, management apparatus 118 may use features 114 and locations 116 to measure a distance between two points in the environment, as discussed in further detail below with respect to FIG. 4. Alternatively, management apparatus 118 may use model 118 to generate a blueprint of the environment, as discussed in further detail below with respect to FIG. 3.

Figure 2:
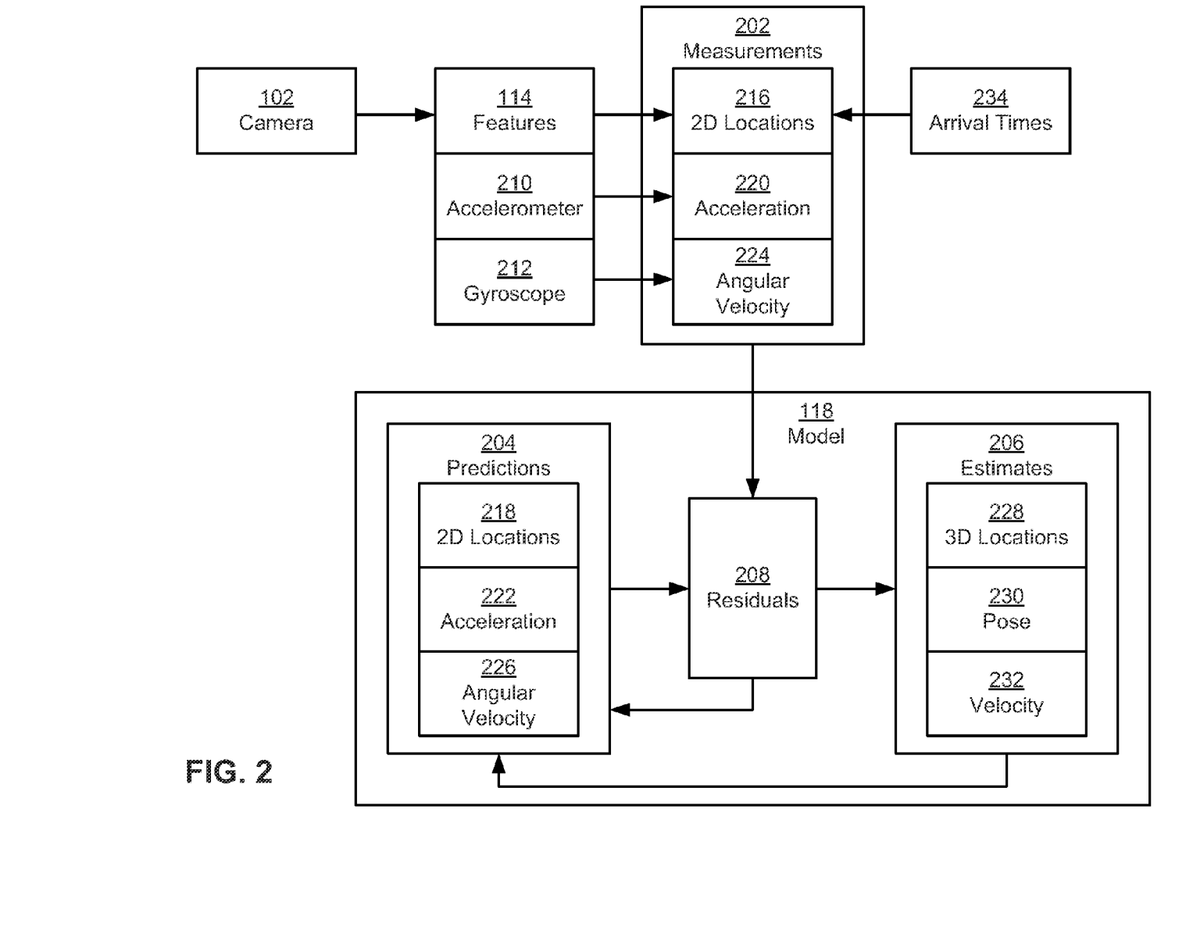
FIG. 2 shows the updating of the locations of a set of features in proximity to a portable electronic device in accordance with one or more embodiments.

FIG. 2 shows the updating of the locations features 114 in proximity to a portable electronic device (e.g., portable electronic device 100 of FIG. 1) in accordance with one or more embodiments. The locations may be based on periodic measurements 202 of data from a set of built-in sensors on the portable electronic device, including camera 102, an accelerometer 210, and/or a gyroscope 212.

More specifically, images from camera 102 may be used to obtain a set of features 114 in proximity to the portable electronic device, with measurements 202 of 2D locations 216 of features 114 obtained as pixel locations of regions of the images corresponding to features 114. Prior to identifying features 114 and/or obtaining 2D locations 216, the images may be pre-processed to remove distortion and/or optical aberrations caused by the lens and/or sensor of camera 102. As described above, features 114 may then be identified and tracked across the images using a number of feature-detection and/or optical-flow estimation techniques and/or user input from the user of the portable electronic device.

Inertial data related to the motion of the portable electronic device may also be obtained from one or more inertial sensors on the portable electronic device. For example, measurements 202 of acceleration 220 and angular velocity 224 may be obtained from an accelerometer 210 and gyroscope 212, respectively, provided by an inertial measurement unit (IMU) on the portable electronic device. To further facilitate tracking of features 114 across images, the inertial data may be used to determine the movement of the portable electronic device between two consecutive images, and in turn, the amount by which features 114 are expected to shift between the images.

Those skilled in the art will appreciate that the portable electronic device may include a rolling-shutter camera 102 that sequentially captures scan lines of each image instead of a global-shutter camera that captures the entire image at the same time. As a result, movement and/or rotation of the portable electronic device may shift one or more features 114 within the image before the features are captured by the shutter. To correct for such motion-based distortions in the image, 2D locations 216 may be analyzed and/or updated based on arrival times 234 of scan lines within the image. For example, arrival times 234, acceleration 220, and angular velocity 224 may be used to shift 2D locations 216 so that 2D locations 216 reflect the locations of all visible features 114 at the arrival time of the first scan line of the image. Alternatively, each scan line may be considered a separate image taken at a different time by camera 102, and measurements 202 of 2D locations 216 may be viewed as taken at the corresponding arrival times 234 of scan lines containing 2D locations 216.

Measurements 202 may then be provided as input to model 118 and compared to a set of predictions 204 of 2D locations 218, acceleration 222, and/or angular velocity 226 to obtain a set of estimates 206 of 3D locations 228 of features 114 and the pose 230 (e.g., position and orientation) and velocity 232 of the portable electronic device. As mentioned above, model 118 may be implemented using an EKF that recursively makes estimates 206 of unknown states (e.g., 3D locations 228, pose 230, and velocity 232) based on measurements 202 of attributes related to the states (e.g., 2D locations 216, acceleration 220, angular velocity 224).

More specifically, the EKF may include a set of measurement equations that describe the relationships between measurements 202 and the unknown states. To obtain estimates 206, model 118 may use the measurement equations to provide a set of predictions 204 of 2D locations 218, acceleration 222, and angular velocity 226 for each set of measurements 202 based on previous estimates 206 and residuals 208 between previous predictions 204 and measurements 202 corresponding to the predictions.

Next, predictions 204 may be compared with the most recent set of measurements 202 for which predictions 204 are made to determine a new set of residuals 208 between predictions 204 and measurements 202. Residuals 208 may then be used to update the measurement equations and/or produce estimates 206 of 3D locations 228 and/or the portable electronic device's motion (e.g., pose 230, velocity 232, etc.). Quality-of-fit for each feature may also be tracked during use of model 118 so that spurious features (e.g., non-stationary objects, visual artifacts, etc.) can be thrown away as outliers. Using an EKF to track 3D locations of features and/or the motion of a camera with respect to the features is described in "Large Scale Visual Navigation and Community Map Building," by Jones, Eagle Sunrise Ph.D., University of California Los Angeles, ProQuest/UMI, 2009, 145 pages; Publication Number AAT 3384010, which is incorporated herein by reference.

For example, camera 102 may include an image sensor that captures a one-centimeter by one-centimeter plane located one centimeter in front of the optical center of camera 102. Thus, the image center may have a 3D location in meters of (0, 0, 0.01). Furthermore, camera 102 may undergo a rigid body transformation during movement of the portable electronic device. That is, camera 102 may translate along and/or rotate around three axes. If translation is defined as T(t), rotation is defined as R(t), and the origin of the coordinate frame is defined as the location of camera 102 when tracking is initially enabled, T(0) and R(0) are identity transforms.

If a feature is found in the upper right corner of the image at time t=0, the 2D location of the feature on the image plane may be measured as y(0)=(0.005, 0.005). In addition, the feature may be located at a point x in 3D space, which exists somewhere along the line passing between the origin (0, 0, 0) and the position of the point in the image plane, or (0.005, 0.005, 0.01). Triangle ratios may be used to determine that all points along this line have the form $x=(0.005*\rho, 0.005*\rho, \rho)$ for some $\rho$ that represents the depth of x in 3D space. Because $\rho$ may represent an unknown quantity to be estimated, $\rho$ may be added to the states to be estimated by the EKF (e.g., in 3D locations 228) for update based on future image measurements. Similarly, representations of T(t) and R(t) may also be added to the EKF (e.g., as pose 230) for estimation and/or tracking.

At some time t=1, a new measurement y(1) may be made of the feature in the image plane. To update estimates 206 of the unknown states, a prediction of y(1) may be made. If the estimate for the depth of the point is ρ=300, the feature may be estimated to be located at x=(1.5, 1.5, 3). To predict y(1), x may be translated and rotated by the current estimates of T(1) and R(1) and then projected onto the image plane (e.g., by dividing the resulting coordinate by the depth of the coordinate). Finally, the residual between the measurement of the feature and the prediction may be calculated and propagated through the EKF to update the estimated states.

In addition, measurements of acceleration 220, angular velocity 224, and/or other inertial data may be related to T(t) and R(t) by kinematic relationships. More specifically, accelerometer 210 and gyroscope 212 may provide measurements of acceleration 220 and angular velocity 224, along with some noise and bias. States representing acceleration 220, angular velocity 224, and linear velocity 232 of the portable electronic device may be included in the EKF and updated using the kinematic relationships (e.g., integrating acceleration to get velocity, integrating velocity to get position, etc.). To account for the measurement of gravity by accelerometer 210, the EKF may include a measurement equation that transforms gravity into the current frame and adds the gravity to the local acceleration.

Model 118 may also be adjusted based on the timing and/or values of measurements 202 from camera 102, accelerometer 210 and/or gyroscope 212. For example, camera 102 may have a latency of 30-60 milliseconds, accelerometer 210 and/or gyroscope 212 may have latencies of less than 10 milliseconds, and individual measurements may be dropped or delayed. As mentioned above, scan lines of images from camera 102 may also be captured at different times. Such differences in the timing and/or locations of measurements 202 from different sensors may produce significant error in model 118. To account for the arrival of non-simultaneous measurements 202 at non-uniform intervals, individual measurements 202 may be timestamped immediately upon receipt, and measurements 202 may be re-ordered prior to processing by model 118 to prevent negative time steps.

To facilitate efficient tracking of 3D locations 228, pose 230, and/or velocity 232 on the portable electronic device, model 118 may be used to estimate 3D locations 228 for a subset of features 114. The remainder of 3D locations 228 may then be tracked using triangulation, which may be associated with significantly less computational overhead than tracking using model 118. For example, a small number of features 114 may be selected for use in making predictions 204 and estimates 206 within model 118. 3D locations 228 of other features 114 detected by the portable electronic device may initially be calculated relative to the 2D and/or 3D locations of features 114 tracked by model 118 and updated based on different views of the other features from camera 102 and distances between the views, as calculated from acceleration 220 and/or angular velocity 224.

Those skilled in the art will appreciate that model 118 may be implemented in a variety of ways. First, model 118 may use different measurements 202 and/or produce different predictions 204 and/or estimates 206 based on the types of sensors on the portable electronic device and/or the use of model 118 by the portable electronic device. For example, measurements 202 and/or predictions 204 may include sensor readings from a compass, Global Positioning System (GPS) receiver, wireless transceiver, cellular radio, and/or other built-in sensors that may be used to detect the position, orientation, and/or motion of the portable electronic device. Estimates 206 may also include textures associated with features 114 and/or the environment and/or calibration information between the sensors to facilitate accurate reconstruction of the environment by model 118. Conversely, estimates 206 may omit depth information for 3D locations 228 if features 114 are used to estimate the distance between a first point initially occupied by the portable electronic device and a second point to which the portable electronic device is subsequently moved, as discussed in further detail below with respect to FIG. 4.

Second, model 118 may be created, updated, and/or implemented using a number of techniques. For example, model 118 may be provided by a hidden Markov model, Bayesian network, unscented Kalman filter, and/or another state-estimation technique or model. Moreover, processing related to model 118 may be performed on a CPU, GPU, and/or other processor on the portable electronic device to facilitate timely updates to predictions 204, estimates 206, and/or residuals 208 based on measurements 202 while enabling execution of other applications and/or processes on the portable electronic device.

Finally, features 114 and 3D locations 228 may be fit to a useful representation of the environment around the portable electronic device. For example, features 114 may represent the corners and/or edges of walls of an interior environment (e.g., building) to be mapped by the portable electronic device. As a result, 3D locations 228 of features 114 may be used as the boundaries of the interior environment, and a blueprint of the interior environment may be generated from 3D locations 228. Features 114 may additionally include specialized features, such as power outlets, windows, doors, light switches, and/or furniture. The specialized features may be included in the blueprint and/or separated from the blueprint to facilitate use of the blueprint by a user of the portable electronic device and/or other users.

Figure 3:
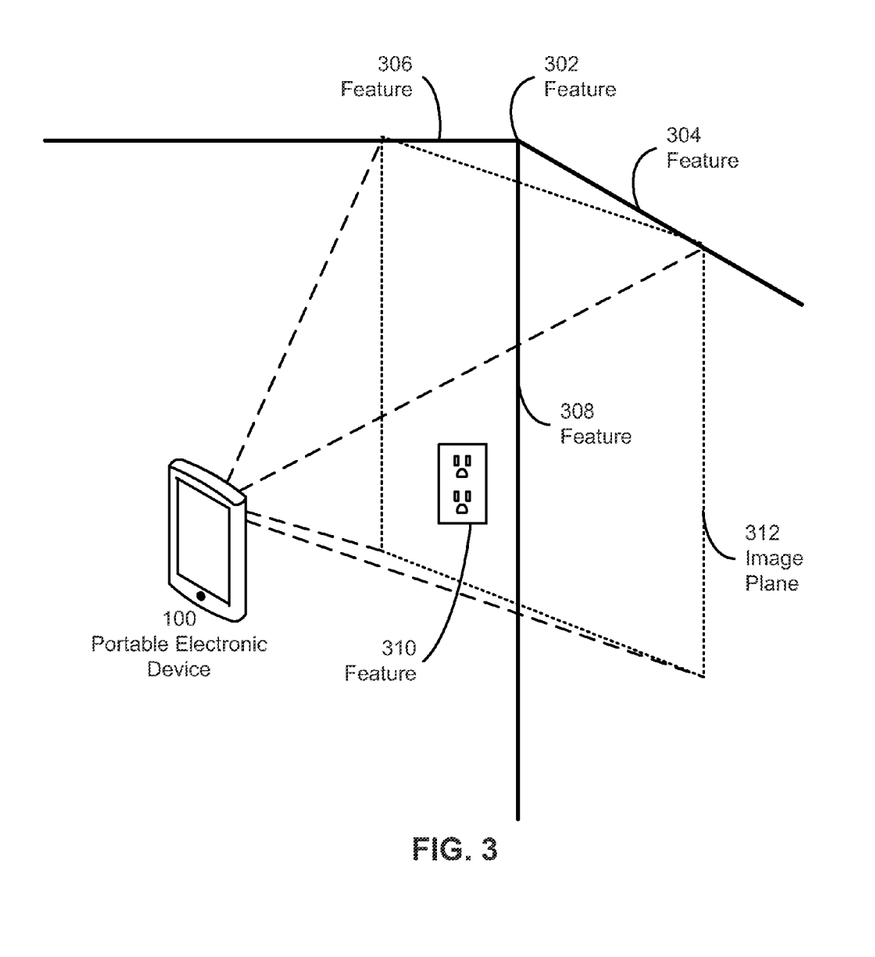
FIG. 3 shows the identification of a set of features in proximity to a portable electronic device in accordance with one or more embodiments.

FIG. 3 shows the identification of a set of features 302-310 in proximity to portable electronic device 100 in accordance with one or more embodiments. As shown in FIG. 3, features 302-310 may be captured by an image plane 312 of a camera (e.g., camera 102 of FIG. 1) on portable electronic device 100.

Features 302-310 may then be identified and/or tracked across images captured by the camera. For example, feature 302 may represent the top corner of a room, features 304-308 may represent edges between the walls and/or ceiling of the room that form the top corner, and feature 310 may represent a power outlet along one of the walls. In other words, features 302-310 may be captured from an interior environment within image plane 312 by portable electronic device 100.

To detect features 302-310, a SIFT, Shi-Tomasi technique, and/or other feature-detection technique may be applied to the images to identify regions that match descriptions of features 302-310, even under partial occlusion and/or changes in illumination, scale, and/or noise. For example, feature 302 may be represented by an intersection of three high-contrast lines, each feature 304-308 may be represented by one of the high-contrast lines, and feature 310 may be represented by a collection of feature vectors formed by a power outlet in an image.

3D locations (e.g., 3D locations 228 of FIG. 2) of features 302-310 may then be estimated by portable electronic device 100 and used to generate a model (e.g., model 118 of FIG. 1) of the environment around portable electronic device 100. As described above, previous estimates of the 3D locations and/or the pose of the portable electronic device may be used to predict 2D locations of features 302-310 in image plane 312 and/or inertial data collected from an accelerometer, gyroscope, and/or other inertial sensors on portable electronic device 100. The predictions may be compared to measurements of the 2D locations and/or inertial data to obtain residuals that are used to update the model and/or generate new estimates of the 3D locations and/or pose.

The model may then be provided by portable electronic device 100 for use by a user. For example, portable electronic device 100 may generate a blueprint of the interior environment (e.g., room) represented by features 302-310. To generate the blueprint, portable electronic device 100 may use the 3D locations of features 302-308 as boundaries of the interior environment and the 3D location of feature 310 to display a representation of the object denoted by feature 310 (e.g., a power outlet) within the blueprint. For example, portable electronic device 100 may generate a polygon mesh from the 3D locations of features 302 and add a visual representation of a power outlet to the 3D location of feature 310 within the polygon mesh. The blueprint may then be used in the design, remodel, repair, sale, and/or appraisal of the interior environment by the user and/or other users.

Consequently, portable electronic device 100 may fit 3D locations of features 302-310 to the environment to be modeled. To further facilitate construction of the model and/or boundaries of the environment within the model, portable electronic device 100 may use lines of sight between the camera and features 302-310 at each position of portable electronic device 100 to identify unoccupied regions of the environment and build a representation of the volume of the interior space within the model. Input from the user may also be obtained to identify the boundaries and/or unoccupied regions. For example, the user may use portable electronic device 100 to identify one or more features 302-310 within image plane 312 and/or verify the presence or absence of obstacles (e.g., furniture, walls, fixtures, etc.) between portable electronic device 100 and features 302-310. In turn, the user input, lines of sight, and/or unoccupied regions may be used to build a polygon mesh representing the boundaries and/or contents of the environment more effectively than if only the 3D locations of features 302-310 were known to portable electronic device 100.

Figure 4:
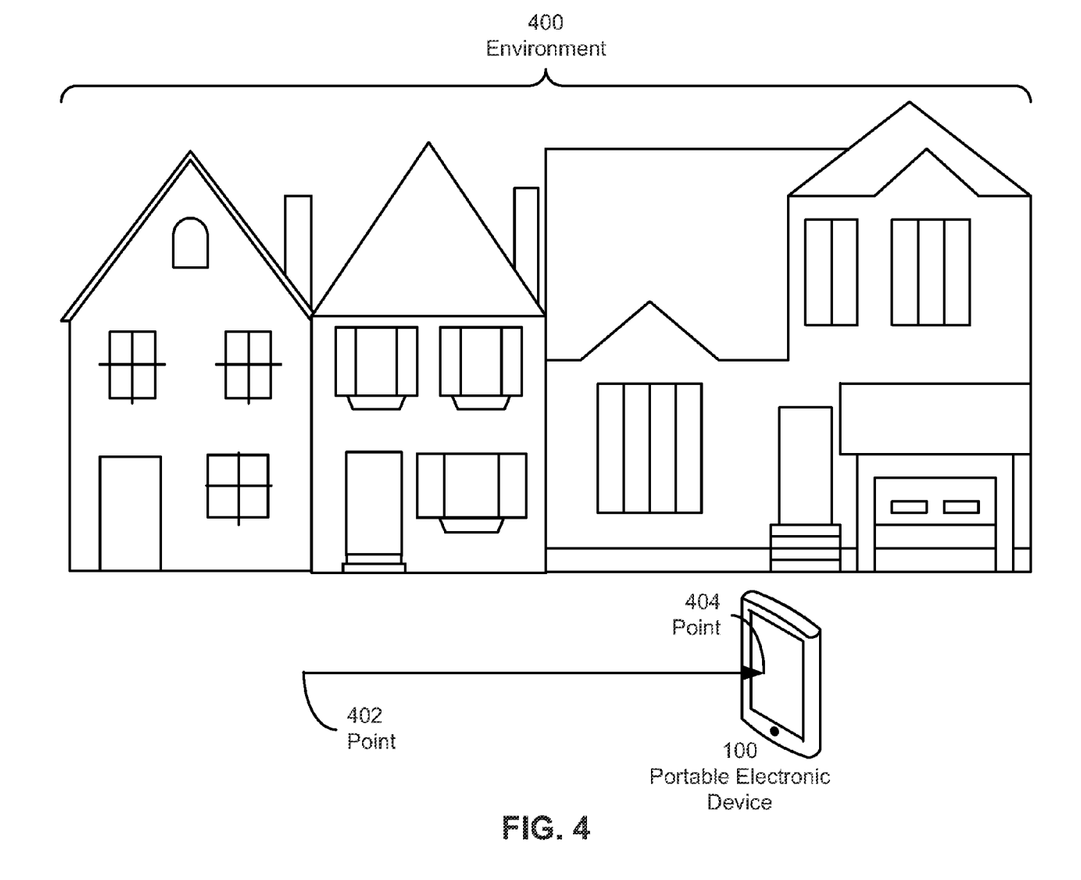
FIG. 4 shows the use of a portable electronic device to measure a distance between two points in accordance with one or more embodiments.

FIG. 4 shows the use of portable electronic device 100 to measure a distance between two points 402-404 in accordance with one or more embodiments. The distance may be tracked by moving portable electronic device 100 from a first point 402 to a second point 404. For example, a user may use portable electronic device 100 as a "virtual" tape measure between points 402-404 by initiating the measurement while portable electronic device 100 is at point 402, walking with portable electronic device 100 to point 404, and reading the measured distance (e.g., linear or nonlinear) from portable electronic device 100 at point 404.

The movement may be detected by inertial sensors such as an accelerometer and/or gyroscope on portable electronic device 100, and the distance may be calculated using readings from the inertial sensors. For example, a numeric-integration technique may be used to integrate acceleration from the accelerometer twice to obtain the position of portable electronic device 100 and angular velocity from the gyroscope once to obtain the angular position of portable electronic device 100. However, integration of acceleration and/or angular velocity to obtain the pose of portable electronic device 100 may increase the amount of noise and/or drift associated with calculation of the pose, resulting in inaccurate calculation of the distance between points 402-404.

To improve tracking of movement and/or rotation on portable electronic device 100, a camera (e.g., camera 102 of FIG. 1) on portable electronic device 100 may be used to capture images of an environment 400 around portable electronic device. Features from the images may then be identified, tracked, and used to cancel out drift from the accelerometer, gyroscope, and/or other inertial sensors and facilitate accurate measurement of the distance between points 402-404.

For example, environment 400 may include a number of stationary objects, such as houses containing windows, doors, driveways, and/or other identifiable, high-contrast features. The features may be tracked within images captured by the camera, and 2D locations of the features may be included in a model (e.g., model 118 of FIG. 1) of the environment. The model may be used to generate predictions of the 2D locations and/or sensor readings from the inertial sensors, and the predictions may be compared with measurements of the 2D locations from the camera and/or sensor readings from the inertial sensors to determine the accuracy of the model. Residuals between the predictions and measurements may also be calculated and used to correct errors (e.g., noise, drift, etc.) in the model and/or sensor readings. Finally, the updated model may be used to generate an estimate of the actual movement, rotation, position, and/or orientation of portable electronic device 100, thus increasing the accuracy of the calculated distance traveled by portable electronic device 100.

Because the model may be used to track the motion of the device instead of generate a reconstruction of environment 400, the model may lack states related to the 3D locations of the features in environment 400. For example, the model may omit depth information related to the 3D locations and track only the 2D locations of the features on the image plane of the camera. In turn, the model may be simpler than the model used to track features 302-310 of FIG. 3, which may further facilitate the efficient measuring of distances on a resource-constrained portable electronic device 100.

Figure 5:
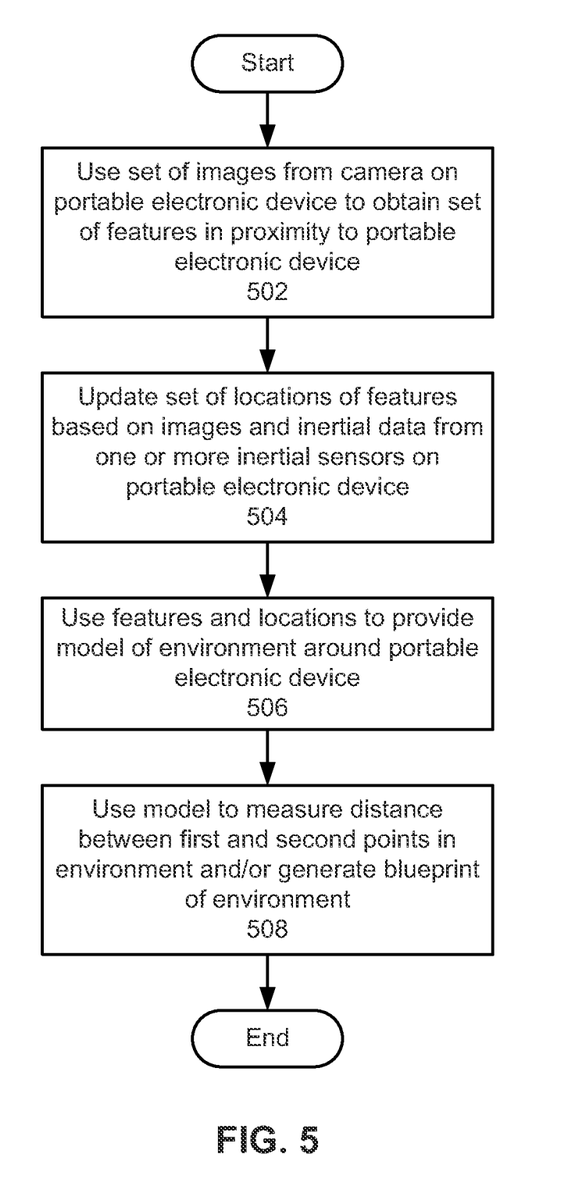
FIG. 5 shows a flowchart illustrating the process of operating a portable electronic device in accordance with one or more embodiments.

FIG. 5 shows a flowchart illustrating the process of operating a portable electronic device in accordance with one or more embodiments. In one or more embodiments, one or more of the steps may be omitted, repeated, and/or performed in a different order. Accordingly, the specific arrangement of steps shown in FIG. 5 should not be construed as limiting the scope of the embodiments.

Initially, a set of images from a camera on the portable electronic device is used to obtain a set of features in proximity to the portable electronic device (operation 502). For example, the images may be captured using a rolling shutter and/or global shutter on the camera, and the features may be identified using a SIFT, Shi-Tomasi technique, other feature-detection technique, and/or input from a user of the portable electronic device. The features may then be tracked across the images using an optical-flow-estimation technique such as Lucas-Kanade and/or motion information for the portable electronic device, which may be obtained using inertial data from one or more inertial sensors (e.g., accelerometer, gyroscope, GPS receiver, compass, etc.) on the portable electronic device.

Next, a set of locations of the features is updated based on the images and inertial data (operation 504). Updating the locations based on the images and inertial data is described in further detail below with respect to FIG. 6. The features and locations may then be used to provide a model of an environment around the portable electronic device (operation 506). For example, the features and locations may be used to provide a reconstruction of the environment. Finally, the model may be used to measure a distance between a first point and a second point in the environment and/or generate a blueprint of the environment (operation 508). For example, the features and/or locations may be used to denote walls, ceilings, and/or other boundaries of the environment; identify furniture, power outlets, windows, fixtures, and/or other objects in the environment; and/or track a path traveled by the portable electronic device within the environment.

Figure 6:
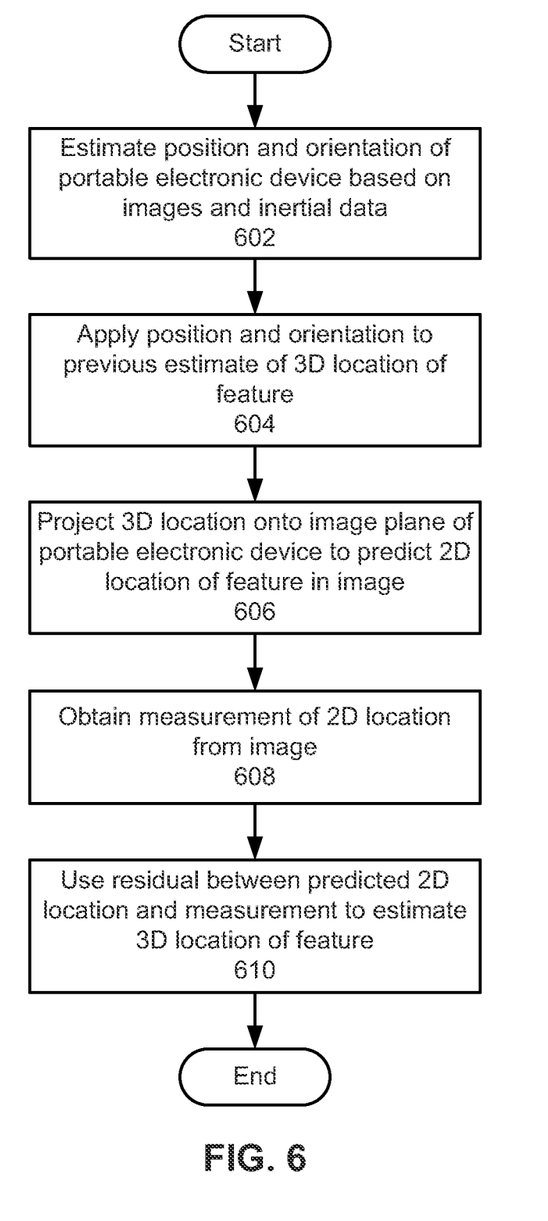
FIG. 6 shows a flowchart illustrating the process of updating a set of locations of a set of features in proximity to a portable electronic device in accordance with one or more embodiments.

FIG. 6 shows a flowchart illustrating the process of updating a set of locations of a set of features in proximity to a portable electronic device in accordance with one or more embodiments. In one or more embodiments, one or more of the steps may be omitted, repeated, and/or performed in a different order. Accordingly, the specific arrangement of steps shown in FIG. 6 should not be construed as limiting the scope of the embodiments.

First, the model is used to predict a 2D location of a feature from the set of features in an image from the set of images. The feature may be a corner, edge, and/or specialized feature with a 2D pixel location and/or coordinate in the image. More specifically, a position and orientation of the portable electronic device are estimated based on the images and inertial data from a set of sensors (e.g., camera, inertial sensors, etc.) built into the portable electronic device (operation 602). For example, the position and orientation may be estimated as a set of unknown states within an EKF and/or other model of the environment around the portable electronic device.

Next, the position and orientation are applied to a previous estimate of a 3D location of the feature (operation 604). For example, the position and orientation are used to translate and rotate the 3D location so that the 3D location is updated to account for motion of the portable electronic device that occurred after the previous estimate of the 3D location. The 3D location is then projected onto an image plane of the portable electronic device to predict the 2D location of the feature in the image (operation 606). For example, the 2D location may be calculated by dividing the 3D location by the difference in depth between the feature and the image plane.

The position and/or orientation may additionally be used to update the model. For example, lines of sight from the new position and/or orientation to visible features in the image may be used to update a representation of the volume of unoccupied space in the model. The representation may then be used to fit the features to boundaries, objects, and/or other aspects of the environment in the model.

A measurement of the 2D location is also obtained from the image (operation 608), and a residual between the predicted 2D location and the measurement is used to estimate the 3D location of the feature (operation 610). For example, the residual may be calculated as the difference between the predicted pixel location of the feature in the image and the actual pixel location of the feature from the image. The residual may then be used to update a set of measurement equations in the model, and the updated measurement equations may be used to estimate the depth of the feature. The 2D location may then be scaled by the depth to obtain a new value for the 3D location of the feature. In other words, the residual may be used to recursively "correct" for noise, drift, and/or other errors in the measurements and, in turn, reduce the estimated uncertainty and/or inaccuracy of the model.

Figure 7:
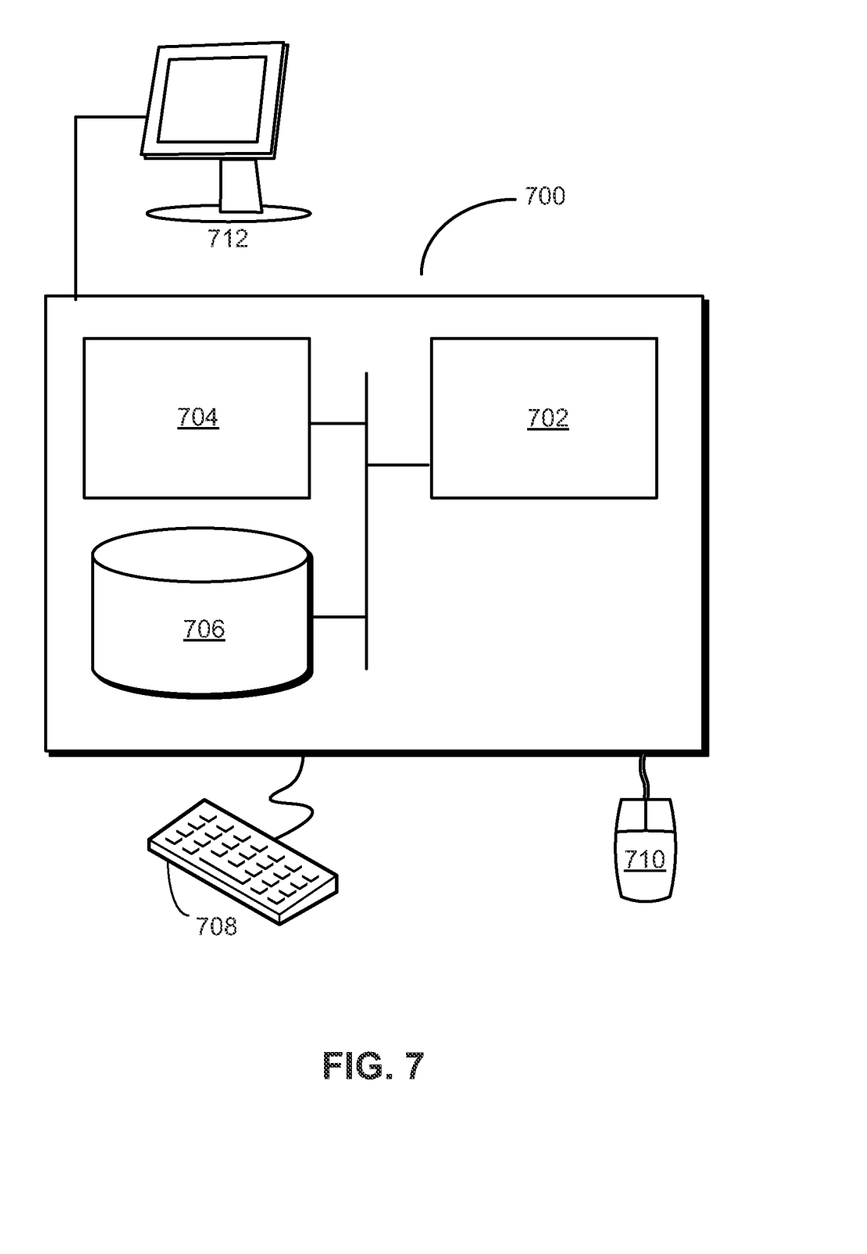
FIG. 7 shows a computer system in accordance with one or more embodiments.

FIG. 7 shows a computer system 700 in accordance with one or more embodiments. Computer system 700 includes a processor 702, memory 704, storage 706, and/or other components found in electronic computing devices. Processor 702 may support parallel processing and/or multi-threaded operation with other processors in computer system 700. Computer system 700 may also include input/output (I/O) devices such as a keyboard 708, a mouse 710, and a display 712.

Computer system 700 may include functionality to execute various components of the present embodiments. In particular, computer system 700 may include an operating system (not shown) that coordinates the use of hardware and software resources on computer system 700, as well as one or more applications that perform specialized tasks for the user. To perform tasks for the user, applications may obtain the use of hardware resources on computer system 700 from the operating system, as well as interact with the user through a hardware and/or software framework provided by the operating system.

In one or more embodiments, computer system 700 provides a system for operating a portable electronic device such as a mobile phone, tablet computer, personal digital assistant, portable media player, and/or digital camera. The system may include a camera that obtains a set of images and one or more inertial sensors that obtain inertial data associated with the portable electronic device. The system may also include an analysis apparatus that uses the set of images to obtain a set of features in proximity to the portable electronic device.

Next, the analysis apparatus may update a set of locations of the features based on the set of images and the inertial data. The analysis apparatus may then use the set of features and the set of locations to provide a model of an environment around the portable electronic device without requiring the use of specialized hardware to track the features and the locations. Finally, the system may include a management apparatus that uses the model to generate a blueprint of the environment and/or measure a distance between a first point in the environment and a second point in the environment.

In addition, one or more components of computer system 700 may be remotely located and connected to the other components over a network. Portions of the present embodiments (e.g., camera, inertial sensors, analysis apparatus, management apparatus etc.) may also be located on different nodes of a distributed system that implements the embodiments. For example, the present embodiments may be implemented using a cloud computing system that processes images and/or inertial data from a remote portable electronic device to create a 3D model of the environment around the portable electronic device.

Although the disclosed embodiments have been described with respect to a limited number of embodiments, those skilled in the art, having benefit of this disclosure, will appreciate that many modifications and changes may be made without departing from the spirit and scope of the disclosed embodiments. Accordingly, the above disclosure is to be regarded in an illustrative rather than a restrictive sense. The scope of the embodiments is defined by the appended claims.

What is claimed is:

1. A method for operating a portable electronic device, comprising:

using a set of images from a camera on the portable electronic device to obtain a set of features in proximity to the portable electronic device;

updating, by the portable electronic device, a set of locations of the features based on the set of images and inertial data from one or more inertial sensors on the portable electronic device, wherein updating the set of locations of the features based on the set of images and the inertial data comprises:

providing the inertial data as input to a three-dimensional (3D) model;

using the 3D model to predict a two-dimensional (2D) location of a feature from the set of features in an image from the set of images;

obtaining a measurement of the 2D location from the image; and using a residual between the predicted 2D location and the measurement to estimate a 3D location of the feature; and using the set of features and the set of locations to provide, on the portable electronic device, the 3D model of an environment around the portable electronic device.

2. The method of claim 1, further comprising:
using the 3D model to measure a distance between a first point in the environment and a second point in the environment.

3. The method of claim 1, further comprising:
using the 3D model to generate a blueprint of the environment.

4. The method of claim 3, wherein the set of features comprises at least one of:
a corner;
an edge; and
a specialized feature.

5. The method of claim 3, wherein the set of features is associated with one or more boundaries of the environment.

6. The method of claim 1, wherein using the set of images from the camera to obtain the set of features in proximity to the portable electronic device comprises at least one of:
tracking the features across the set of images; and
identifying the features based on input from a user of the portable electronic device.

7. The method of claim 1, wherein using the 3D model to predict the 2D location of the feature comprises:
estimating a position and an orientation of the portable electronic device based on the set of images and the inertial data;
applying the position and the orientation to a previous estimate of the 3D location; and
projecting the 3D location onto an image plane of the portable electronic device.

8. The method of claim 7, wherein using the set of features and the set of locations to provide the 3D model of the environment around the portable electronic device comprises:
updating the 3D model of the environment based on the position of the portable electronic device.

9. The method of claim 1, wherein the 3D location is estimated based on a depth of the feature and the 2D location.

10. The method of claim 1, wherein the 2D location is associated with an arrival time of a scan line of the image.

11. The method of claim 1, wherein the one or more inertial sensors comprise at least one of:
an accelerometer; and
a gyroscope.

12. The method of claim 1, wherein the 3D model comprises:
a position of the portable electronic device;
an orientation of the portable electronic device; and
a velocity of the portable electronic device.

13. The method of claim 1, wherein the model comprises an extended Kalman filter (EKF) that uses the residual to adjust the state of the EKF and estimate the 3D location of the feature.

14. A portable electronic device, comprising:
a camera configured to obtain a set of images;
one or more inertial sensors configured to obtain inertial data associated with the portable electronic device; and
an analysis apparatus configured to:
use the set of images to obtain a set of features in proximity to the portable electronic device;
update a set of locations of the features based on the set of images and the inertial data, wherein updating the set of locations of the features based on the set of images and the inertial data comprises:
providing the inertial data as input to a three-dimensional (3D) model;
using the 3D model to predict a two-dimensional (2D) location of a feature from the set of features in an image from the set of images;
obtaining a measurement of the 2D location from the image; and
using a residual between the predicted 2D location and the measurement to estimate a 3D location of the feature; and
use the set of features and the set of locations to provide the 3D model of an environment around the portable electronic device.

15. The portable electronic device of claim 14, wherein using the set of images from the camera to obtain the set of features in proximity to the portable electronic device comprises at least one of:
tracking the features across the set of images; and
identifying the features based on input from a user of the portable electronic device.

16. The portable electronic device of claim 14, wherein using the 3D model to predict the 2D location of the feature comprises:
estimating a position and an orientation of the portable electronic device based on the set of images and the inertial data;
applying the position and the orientation to a previous estimate of the 3D location; and
projecting the 3D location onto an image plane of the portable electronic device.

17. A non-transitory computer-readable storage medium containing instructions embodied therein for causing a computer system to perform a method for operating a portable electronic device, the method comprising:
using a set of images from a camera on the portable electronic device to obtain a set of features in proximity to the portable electronic device;
updating a set of locations of the features based on the set of images and inertial data from one or more inertial sensors on the portable electronic device, wherein updating the set of locations of the features based on the set of images and the inertial data comprises:
providing the inertial data as input to a three-dimensional (3D) model;
using the 3D model to predict a two-dimensional (2D) location of a feature from the set of features in an image from the set of images;
obtaining a measurement of the 2D location from the image; and
using a residual between the predicted 2D location and the measurement to estimate a 3D location of the feature; and
using the set of features and the set of locations to provide the 3D model of an environment around the portable electronic device.

18. The non-transitory computer-readable storage medium of claim 17, the method further comprising:
using the 3D model to measure a distance between a first point in the environment and a second point in the environment.

19. The non-transitory computer-readable storage medium of claim 17, the method further comprising:
using the 3D model to generate a blueprint of the environment.

20. The non-transitory computer-readable storage medium of claim 17, wherein using the set of images from the camera to obtain the set of features in proximity to the portable electronic device comprises at least one of:
   tracking the features across the set of images; and
   identifying the features based on input from a user of the portable electronic device.

\* \* \* \* \*